United States Patent [19]

Yamamoto et al.

[11] Patent Number: 5,218,049

[45] Date of Patent: * Jun. 8, 1993

[54] SHEET OR FILM COMPOSED OF CYCLO-OLEFIN POLYMER

[75] Inventors: Yohzoh Yamamoto; Takasi Nakagawa, both of Yamaguchi, Japan

[73] Assignee: Mitsui Petrochemical Industries, Ltd., Tokyo, Japan

[*] Notice: The portion of the term of this patent subsequent to Feb. 12, 2008 has been disclaimed.

[21] Appl. No.: 482,256

[22] Filed: Feb. 20, 1990

[30] Foreign Application Priority Data

Feb. 20, 1989 [JP] Japan .................... 1-38454

[51] Int. Cl.$^5$ .............. C08L 23/26; C08L 45/00; C08L 53/02
[52] U.S. Cl. ........................... 525/97; 525/98; 525/193; 525/194; 525/210; 525/211; 524/505; 524/518; 524/553
[58] Field of Search .............. 526/281, 282, 283; 525/210, 211, 97, 98, 193, 194

[56] References Cited

U.S. PATENT DOCUMENTS

| | | | |
|---|---|---|---|
| 2,932,630 | 4/1960 | Robinson et al. | 526/281 X |
| 4,614,778 | 9/1986 | Kajiura et al. | 526/281 |
| 4,874,808 | 10/1989 | Minami et al. | 526/281 X |
| 4,931,520 | 6/1990 | Yamanashi et al. | 526/281 |
| 4,992,511 | 2/1991 | Yamamoto et al. | 525/97 |

OTHER PUBLICATIONS

English translation of Japanese Kokai Pat. No. 60-26024 to Fukazawa et al, published Feb. 8, 1985.

Primary Examiner—Fred Teskin
Attorney, Agent, or Firm—Sherman and Shalloway

[57] ABSTRACT

A sheet or a film composed of at least one cyclo-olefin polymer selected from the group consisting of ring-opened polymers derived from at least one cyclo-olefin of formula (I)

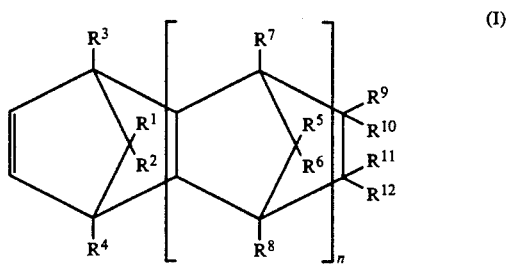

wherein $R^1$ to $R^{12}$, independently from each other, represent a member selected from the class consisting of a hydrogen atom, halogen atoms and hydrocarbon groups; two of $R^9$ to $R^{12}$ may be linked to each other together with the carbon atoms to which they are bonded to form a monocyclic or polycyclic group which may contain a double bond; $R^9$ and $R^{10}$, or $R^{11}$ and $R^{12}$ may each form an alkylidene group together with the carbon atoms to which they are bonded; and n is 0 or a positive integer, ring-opened copolymers derived from the cyclo-olefins of formula (I), hydrogenation products of said polymer or copolymers and addition polymers of the cyclo-olefins of formula (I) with ethylene, said cyclo-olefin polymer having an intrinsic viscosity [$\eta$], measured in decalin at 135° C., of 0.01 to 10 dl/g and a softening temperature of at least 70° C.

2 Claims, No Drawings

SHEET OR FILM COMPOSED OF CYCLO-OLEFIN POLYMER

This invention relates to a sheet or a film composed of a cyclo-olefin polymer. More specifically, it relates to a sheet or a film having excellent elongation resistance, ease of tearing and gas-barrier property.

Polyethylene and polypropylene are shaped into a sheet or a film form and used frequently as packaging material for foods or as an adhesive tape. The food-packaging film and sheet are required to have excellent gas-barrier property and elongation resistance, and for ease of pack opening or the breaking of the adhesive tape, they are also required to have the property of being torn under a slight force (i.e. ease of tearing).

Conventional sheets or films formed of polyethylene and polypropylene are further required to have elongation resistance, gas-barrier property and ease of tear (easy openability).

Japanese Laid-Open Patent Publication No. 26024/1985 discloses an optical material comprising as a constituent material a polymer obtained by hydrogenating a ring-opened polymer of 100 to 50 mole % of units of tetracyclododecene or its derivative and 0 to 50 mole % of units of norbornene or its derivative.

Japanese Laid-Open Patent Publication No. 168708/1985 discloses a random copolymer having an intrinsic viscosity, measured in decalin at 135° C., of 0.5 to 10 dl/g and composed of ethylene and a compound represented by the following formula

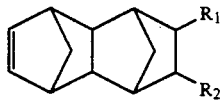

wherein $R_1$ and $R_2$ are identical or different and each represents a hydrogen atom, an alkyl group or a halogen atom.
The mole ratio of ethylene to the above compound being from 10:90 to 90:10, the compound of the above formula mainly constituting structural units of the following formula

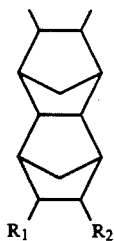

Japanese Laid-Open Patent Publication No. 223013/1988 discloses a polymer of a compound of the following formula

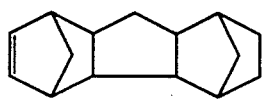

or a copolymer of the above compound and ethylene, the mole ratio of ethylene to the compound of the above formula being 95:5 to 0:100, and the compound of the above formula constituting structural units of the following formula

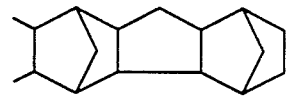

said polymer or copolymer having an intrinsic viscosity, measured in toluene at 25° C., of 0.005 to 20 dl/g.

Japanese Laid-Open Patent Publication No. 243111/1988 is a polymer of a compound of the following formula

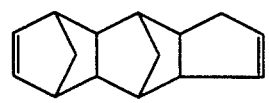

or a copolymer of the compound of the above formula with ethylene, the mole ratio of ethylene to the above compound being from 95:5 to 0:100, the compound of the above formula mainly constituting units of the following formula

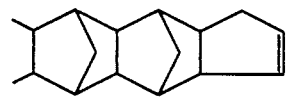

said polymer or copolymer having an intrinsic viscosity, measured in toluene at 25° C., of 0.005 to 20 dl/g.

Japanese Laid-Open Patent Publication No. 305111/1988 discloses a random copolymer of ethylene with a compound of the following formula

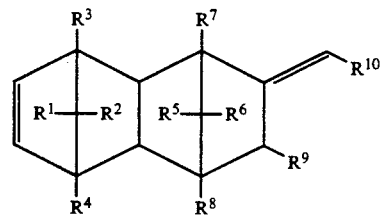

wherein $R^1$ to $R^{10}$ are identical or different, and each represents a hydrogen atom or an alkyl group,
and having an ethylene content of 50 to 90 mole % and an intrinsic viscosity, measured in decalin at 30° C., of 0.3 to 10 dl/g, the compound of the above formula constituting units represented by the following formula.

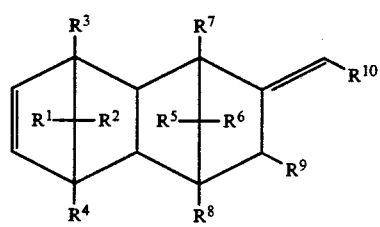

Japanese Laid-Open Patent Publication No. 185307/1989 discloses a random copolymer composed of ethylene and a compound of the following formula

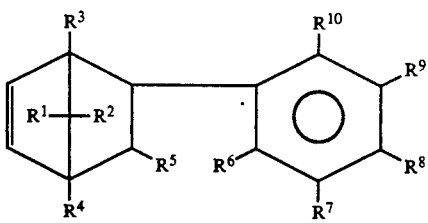

wherein $R^1$ to $R^{10}$ are identical or different, and each represents a hydrogen atom or an alkyl group and $R^5$ may, together with $R^6$ or $R^{10}$, form an alkylene group having 1 to 3 carbon atoms,
and having an ethylene content of 50 to 90 mole % and an intrinsic viscosity, measured in decalin at 30° C., of 0.3 to 10 dl/g, the compound of the above formula constituting units of the following formula

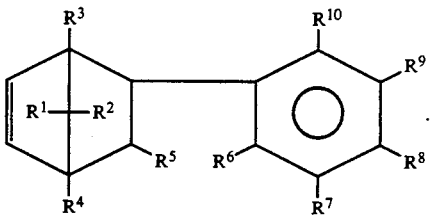

None of these patent documents describe sheets or films of these polymers or copolymers, and describe anything on gas-barrier property.

It is an object of this invention to provide a sheet or a film of a cyclo-olefin polymer.

Another object of this invention is to provide a sheet or a film having excellent elongation resistance, gas-barrier property and ease of tear.

Other objects of the invention and its advantages will become apparent from the following description.

Firstly, the objects and advantages of this invention are achieved by a film or a sheet composed of at least one cyclo-olefin polymer selected from the group consisting of ring-opened polymers derived from at least one cyclo-olefin of formula (I)

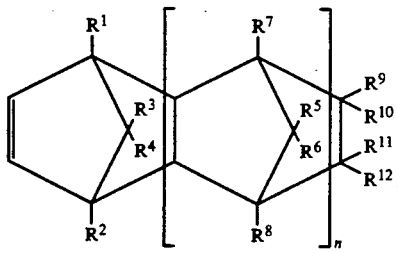

wherein $R^1$ to $R^{12}$, independently from each other, represent a member selected from the class consisting of a hydrogen atom, halogen atoms and hydrocarbon groups; two of $R^9$ to $R^{12}$ may be linked to each other together with the carbon atoms to which they are bonded to form a monocyclic or polycyclic group which may contain a double bond; $R^9$ and or $R^{11}$ and $R^{12}$ may each form an alkylidene group together with the carbon atoms to which they are bonded;
and n is 0 or a positive integer, ring-opened copolymers derived from the cyclo-olefins of formula (I), hydrogenation products of said polymer or copolymers and addition polymers of the cyclo-olefins of formula (I) with ethylene, said cyclo-olefin polymer having an intrinsic viscosity [$\eta$], measured in decalin at 135° C., of 0.01 to 10 dl/g and a softening temperature of at least 70° C.

The sheet or film formed from the cyclo-olefin polymer has excellent elongation resistance, gas-barrier property and ease of tear.

Sheets or films composed of the cyclo-olefin polymers have excellent gas-barrier properties characterized by having lower permeability of gases such as oxygen and carbon dioxide gas than conventional films.

Accordingly, by using the sheet or film of this invention as a packaging material, foods, for example, can be stored for a longer period of time.

Futhermore the sheet or film of the invention has excellent elongation resistance. Specifically, since the sheet or film of this invention has a high elasticity modulus and a low elongation at break, when it is stretched, it is elongated or deformed only to a limited extent unlike conventional films, and is thus suitable for packaging applications.

Furthermore, the sheet or film composed of the cyclo-olefin polymer provided by this invention has excellent ease of tearing, and when the sheet or film of the invention is used as a packaging material, the package can be easily opened.

The sheet or film obtained from the cyclo-olefin polymer in accordance with this invention will be described.

Cyclo-Olefins

The cyclo-olefin polymer constituting the sheet or film of the invention is selected from the group consisting of ring-opened polymers derived from the cyclo-olefins of formula (I), ring-opened copolymers derived from the cyclo-olefins of formula (I), hydrogenation products of said polymers or copolymers, and addition polymers of the cyclo-olefins of formula (I) with ethylene.

These cyclo-olefin polymers may be used singly or in combination.

In formula (I), $R^1$ to $R^{12}$, independently from each other, represent a hydrogen atom, a halogen atom or a hydrocarbon group. The halogen atom may be, for example, fluorine, chlorine, bromine or iodine.

The hydrocarbon groups may include alkyl groups, alkenyl groups, cycloalkyl groups, aryl groups, aralkyl groups, and alkylaryl groups.

The alkyl groups may be linear or branched, and preferably have 1 to 20 carbon atoms.

The alkenyl groups have at least one carbon-carbon double bond, and preferably contain 2 to 20 carbon atoms.

The cycloalkyl groups preferably have 3 to 15 carbon atoms.

The aryl groups preferably have 6 to 14 carbon atoms. The aralkyl and alkylaryl groups are preferably composed of an alkyl group having 1 to 6 carbon atoms further attached to the above aryl group. Examples of preferred aryl and alkylaryl groups are groups of the following formula

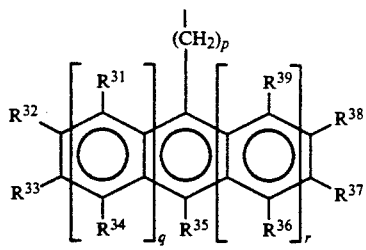

wherein p is 0 or an integer of at least 1, preferably 0, 1 or 2; q and r are 0, 1 or 2; $R^{31}$ to $R^{39}$, independently from each other, represent a hydrogen atom, a halogen atom, an alkoxy group, an aliphatic hydrocarbon group, or an aromatic hydrocarbon group.

Two of $R^9$ and $R^{12}$, particularly adjoining $R^9$ and $R^{10}$, or $R^{11}$ and $R^{12}$ may, together with the carbon atoms to which they are bonded, form a monocyclic or polycyclic group which may contain a double bond. Examples of the monocyclic or polycyclic group are

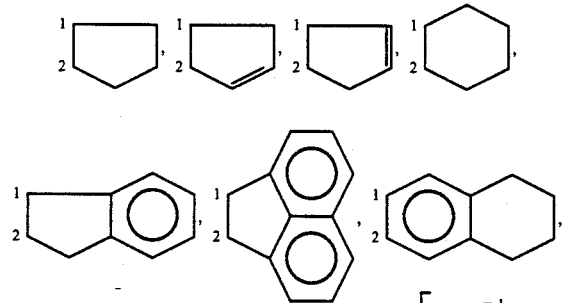

atoms to which they are bonded; and m is 0 or a positive integer.

It should be understood that each of the carbon atoms marked 1 and 2 is the carbon atoms to which $R^9$ and $R^{10}$ are bonded or $R^{11}$ and $R^{12}$ and are bonded.

Examples of the groups of the above formula having $R^{13}$ to $R^{26}$ are those in which all of $R^{13}$ to $R^{26}$ are hydrogen atoms, such as

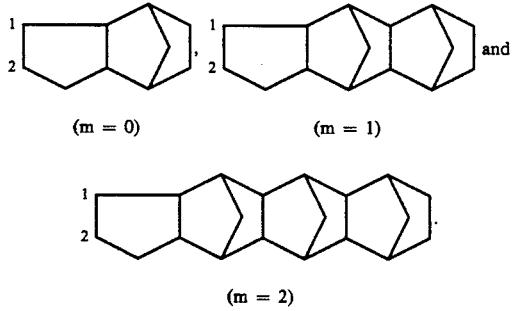

The monocyclic and polycyclic groups other than the groups represented by the above formula having $R^{13}$ to $R^{26}$ may be substituted by an alkyl group such as methyl.

In formula (I), $R^9$ and $R^{10}$ or $R^{11}$ and $R^{12}$ may each form an alkylidene group together with the carbon atoms to which they are bonded. The alkylidene groups by $R^9$ to $R^{12}$ may be substituted by a substituent such as an ester group.

Cyclo-olefins represented by the following formula (II)

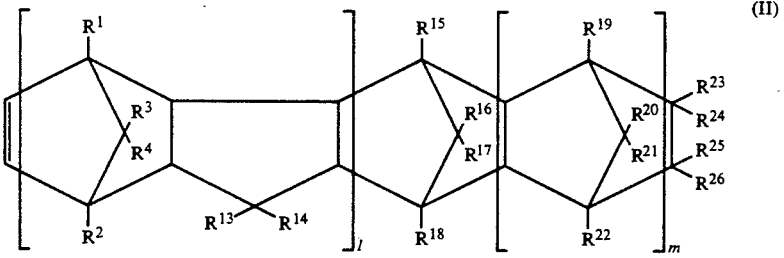

or

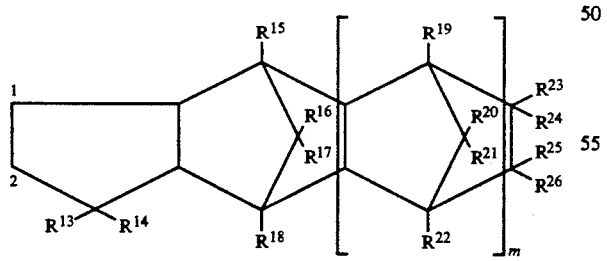

wherein $R^{13}$ to $R^{26}$, independently from each other, represent one member selected from the class consisting of a hydrogen atom, halogen atoms and hydrocarbon groups; two of to $R^{26}$ may be linked to each other to form together with the carbon atoms to which they are bonded a monocyclic or polycyclic group which may include a double bond; $R^{23}$ and $R^{24}$, or $R^{25}$ and $R^{26}$ may each form an alkylidene group together with the carbon wherein $R^1$ to $R^4$, $R^{13}$ to $R^{26}$, and m are as defined above, and l is 0 or 1, are preferred. The above formula (II) corresponds to formula (I) in which n is 0, and $R^9$ and $R^{10}$, or $R^{11}$ and $R^{12}$ are bonded to each other to form a monocyclic or polycyclic group.

A group of cyclo-olefins represented by the following formula (II-a)

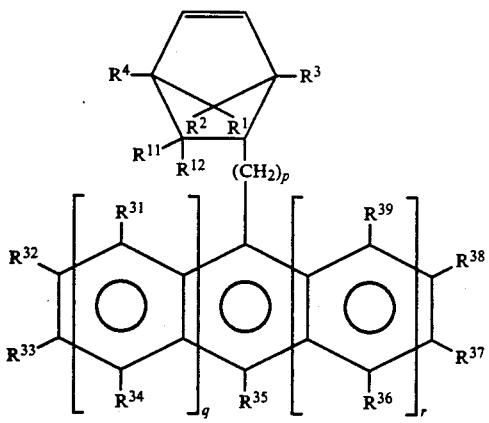

wherein $R^1$ to $R^4$, $R^{11}$, $R^{12}$, $R^{31}$ to $R^{39}$, p, q and r are as defined above or or and $R^{31}$ or $R^{32}$ may be bonded directly or via an
alkylene group having 1 to 3 carbon atoms, also constitute the compounds of formula (I). The formula (II-a) corresponds to formula (I) in which n is 0, $R^9$ or $R^{10}$ correspond to groups exemplified above as the aryl group of the alkylaryl group.

Examples of the cyclo-olefins of formula (I) used in this invention include
bicyclo[2,2,1]hept-2-ene derivatives,
tetracyclo[4,4,0,1$^{2,5}$,1$^{7,1[0]}$]-3-dodecene derivatives,
hexacyclo[6,6,1,1$^{3,6}$,1$^{10,13}$0$^{2,7}$,0$^{9,14}$]-4-heptadecene derivatives,
octacyclo[8,8,0,1$^{2,9}$,1$^{4,7}$,1$^{11,18}$,1$^{13,16}$0$^{3,8}$,0$^{12,17}$]-5-docosene derivatives,
pentacyclo[6,6,1,1$^{3,6}$,0$^{2,7}$,0$^{9,14}$]-4-hexadecene derivatives,
heptacyclo-5-eicosene derivatives,
heptacyclo-5-heneicosene derivatives,
tricyclo[4,3,0,1$^{2,5}$]-3-decene derivatives,
tricyclo[4,3,0,1$^{2,5}$]-3-undecene derivatives,
pentacyclo[6,5,1,1$^{3,6}$,0$^{2,7}$,0$^{9,13}$]-4-pentadecene derivatives,
pentacyclopentadecadiene derivatives,
pentacyclo[4,7,0,1$^{2,5}$,0$^{8,13}$,1$^{9,12}$]-3-pentadecene derivatives,
heptacyclo[7,8,0,1$^{3,6}$,0$^{2,7}$, 1$^{10,17}$,0$^{11,16}$1$^{12,15}$]-4-eicosene derivatives, and
nonacyclo[9,10,1,1$^{4,7}$,0$^{3,8}$,0$^{2,10}$,0$^{12,21}$,1$^{13,20}$, 0$^{4,19}$,1$^{15,18}$]-5-pentacosene derivatives.

Specific examples of these cyclo-olefins of formula (I) are given below.

| (1) bicyclo[2,2,1]hept-2-ene derivatives such as | |
|---|---|
|  | bicyclo[2,2,1]hept-2-ene |
| 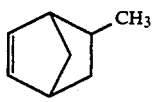 | 6-methylbicyclo[2,2,1]-hept-2-ene |
| 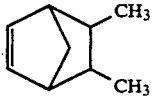 | 5,6-dimethylbicyclo-[2,2,1]hept-2-ene |
| 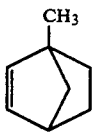 | 1-methylbicyclo-[2,2,1]hept-2-ene |
| 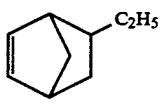 | 6-ethylbicyclo-[2,2,1]hept-2-ene |
| 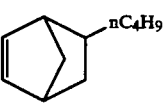 | 6-n-butylbicyclo-[2,2,1]hept-2-ene |
| 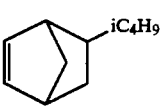 | 6-isobutylbicyclo-[2,2,1]hept-2-ene |

-continued

 7-methylbicyclo[2,2,1]-hept-2-ene (2) tetracyclo[4,4,0,1$^{2,5}$,1$^{7,10}$]-3-dodecene derivatives such as

 tetracyclo[4,4,0,1$^{2,5}$,1$^{7,10}$]-3-dodecene

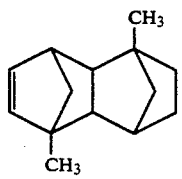 5,10-dimethyltetracyclo-[4,4,0,1$^{2,5}$,1$^{7,10}$]-3-dodecene

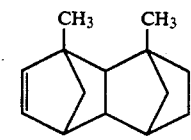 2,10-dimethyltetracyclo-[4,4,0,1$^{2,5}$,1$^{7,10}$]-3-dodecane

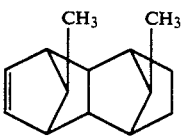 11,12-dimethyltetracyclo-[4,4,0,1$^{2,5}$,1$^{7,10}$]-3-dodecane

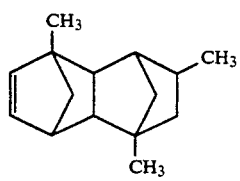 2,7,9-trimethyltetracyclo-[4,4,0,1$^{2,5}$,1$^{7,10}$]-3-dodecene

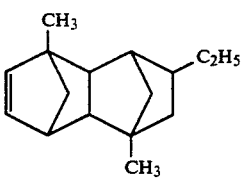 9-ethyl-2,7-dimethyltetracyclo[4,4,0,1$^{2,5}$,1$^{7,10}$]-3-dodecene

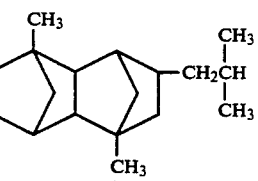 9-isobutyl-2,7-dimethyl-tetracyclo[4,4,0,1$^{2,5}$,1$^{7,10}$]-3-dodecene

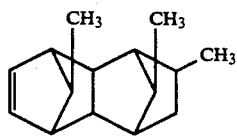 9,11,12-trimethyltetracyclo[4,4,0,1$^{2,5}$,1$^{7,10}$]-3-dodecene

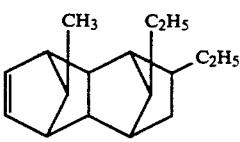 9-ethyl-11,12-dimethyl-tetracyclo[4,4,0,1$^{2,5}$,1$^{7,10}$]-3-dodecene -continued

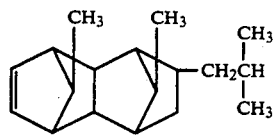
9-isobutyl-11,12-dimethyl-tetracyclo[4,4,0,1$^{2,5}$,1$^{7,10}$]-3-dodecene

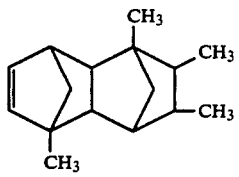
5,8,9,10-tetramethyl-tetracyclo[4,4,0,1$^{2,5}$,1$^{7,10}$]-3-dodecene

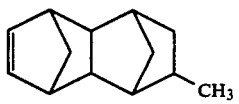
8-methyltetracyclo-[4,4,0,1$^{2,5}$,1$^{7,10}$]-3-dodecene

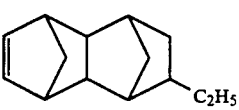
8-ethyltetracyclo-[4,4,0,1$^{2,5}$,1$^{7,10}$]-3-dodecene

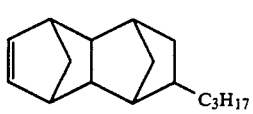
8-propyltetracyclo-[4,4,0,1$^{2,5}$,1$^{7,10}$]-3-dodecene

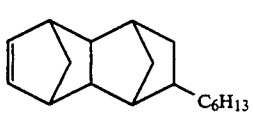
8-hexyltetracyclo-[4,4,0,1$^{2,5}$,1$^{7,10}$]-3-dodecene

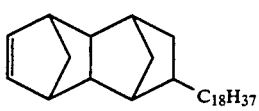
8-stearyltetracyclo-[4,4,0,1$^{2,5}$,1$^{7,10}$]-3-dodecene

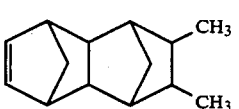
8,9-dimethyltetra-cyclo[4,4,0,1$^{2,5}$,1$^{7,10}$]-3-dodecene

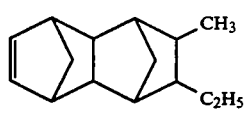
8-methyl-9-ethyltetra-cyclo[4,4,0,1$^{2,5}$,1$^{7,10}$]-3-dodecene

8-chlorotetracyclo-[4,4,0,1$^{2,5}$,1$^{7,10}$]-3-dodecene

8-bromotetracyclo-[4,4,0,1$^{2,5}$,1$^{7,10}$]-3-dodecene

8-fluorotetracyclo-[4,4,0,1$^{2,5}$,1$^{7,10}$]-3-dodecene

-continued

| Structure | Name |
|---|---|
| (dichloro structure) | 8,9-dichlorotetracyclo-[4,4,0,1$^{2,5}$,1$^{7,10}$]-3-dodecene |
| (cyclohexyl structure) | 8-cyclohexyltetracyclo-[4,4,0,1$^{2,5}$,1$^{7,10}$]-3-dodecene |
| (CH$_2$CH(CH$_3$)$_2$ structure) | 8-isobutyltetracyclo-[4,4,0,1$^{2,5}$,1$^{7,10}$]-3-dodecene |
| (C$_4$H$_9$ structure) | 8-butyltetracyclo-[4,4,0,1$^{2,5}$,1$^{7,10}$]-3-dodecene |
| (=CHCH$_3$ structure) | 8-ethylidenetetracyclo-[4,4,0,1$^{2,5}$,1$^{7,10}$]-3-dodecene |
| (CH$_3$, =CHCH$_3$ structure) | 8-ethylidene-9-methyltetra-cyclo[4,4,0,1$^{2,5}$,1$^{7,10}$]-3-dodecene |
| (C$_2$H$_5$, =CHCH$_3$ structure) | 8-ethylidene-9-ethyltetra-cyclo[4,4,0,1$^{2,5}$,1$^{7,10}$]-3-dodecene |
| (CH(CH$_3$)$_2$, =CHCH$_3$ structure) | 8-ethylidene-9-isopropyl-tetracyclo[4,4,0,1$^{2,5}$,1$^{7,10}$]-3-dodecene |
| (C$_4$H$_9$, =CHCH$_3$ structure) | 8-ethylidene-9-butyltetra-cyclo[4,4,0,1$^{2,5}$,1$^{7,10}$]-3-dodecene |
| (=CHCH$_2$CH$_3$ structure) | 8-n-propylidenetetra-cyclo[4,4,0,1$^{2,5}$,1$^{7,10}$]-3-dodecene |
| (CH$_3$, =CHCH$_2$CH$_3$ structure) | 8-n-propylidene-9-methyl-tetracyclo[4,4,0,1$^{2,5}$,1$^{7,10}$]-3-dodecene |
| (C$_2$H$_5$, =CHCH$_2$CH$_3$ structure) | 8-n-propylidene-9-ethyl-tetracyclo[4,4,0,1$^{2,5}$,1$^{7,10}$]-3-dodecene |
| (CH(CH$_3$)$_2$, =CHCH$_2$CH$_3$ structure) | 8-n-propylidene-9-iso-propyltetracyclo[4,4,0,1$^{2,5}$,1$^{7,10}$]-3-dodecene |

-continued

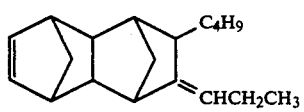
8-n-propylidene-9-butyl-tetracyclo[4,4,0,1$^{2,5}$,1$^{7,10}$]-3-dodecene

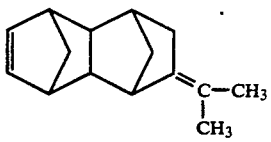
8-isopropylidene-tetra-cyclo[4,4,0,1$^{2,5}$,1$^{7,10}$]-3-dodecene

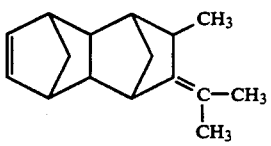
8-isopropylidene-9-methyl-tetracyclo[4,4,0,1$^{2,5}$,1$^{7,10}$]-3-dodecene

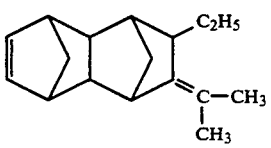
8-isopropylidene-9-ethyl-tetracyclo[4,4,0,1$^{2,5}$,1$^{7,10}$]-3-dodecene

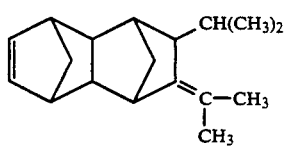
8-isopropylidene-9-iso-propyltetracyclo[4,4,0,1$^{2,5}$,1$^{7,10}$]-3-dodecene

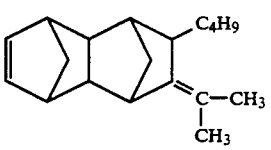
8-isopropylidene-9-butyl-tetracyclo[4,4,0,1$^{2,5}$,1$^{7,10}$]-3-dodecene (3) hexacyclo[6,6,1,1$^{3,6}$,1$^{10,13}$,0$^{2,7}$,0$^{9,14}$]-4-heptadecene derivatives such as

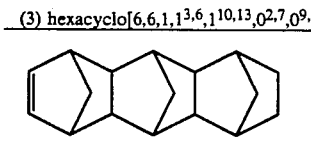
hexacyclo[6,6,1,1$^{3,6}$,1$^{10,13}$,0$^{2,7}$,0$^{9,14}$]-4-heptadecene

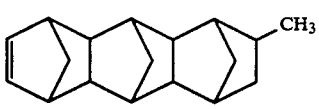
12-methylhexacyclo[6,6,1,1$^{3,6}$,1$^{10,13}$,0$^{2,7}$,0$^{9,14}$]-4-heptadecene

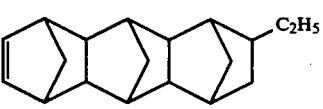
12-ethylhexacyclo[6,6,1,1$^{3,6}$,1$^{10,13}$,0$^{2,7}$,0$^{9,14}$]-4-heptadecene

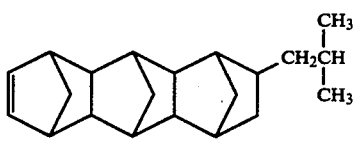
12-isobutylhexacyclo[6,6,1,1$^{3,6}$,1$^{10,13}$,0$^{2,7}$,0$^{9,14}$]-4-heptadecene

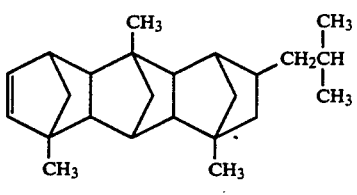
1,6,10-trimethyl-12-iso-butylhexacyclo[6,6,1,1$^{3,6}$,1$^{10,13}$,0$^{2,7}$,0$^{9,14}$]-4-heptadecene -continued (4) octacyclo[8,8,0,1²,⁹,1⁴,⁷,1¹¹,¹⁸,1¹³,¹⁶,0³,⁸,0¹²,¹⁷]-5-docosene derivatives such as

octacyclo[8,8,0,1²,⁹,1⁴,⁷,1¹¹,¹⁸,1¹³,¹⁶,0³,⁸,0¹²,¹⁷]-5-docosene

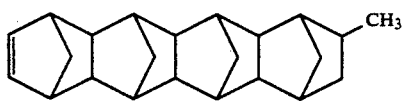
15-methyloctacyclo[8,8,0,1²,⁹,1⁴,⁷,1¹¹,¹⁸,1¹³,¹⁶,0³,⁸,0¹²,¹⁷]-5-docosene

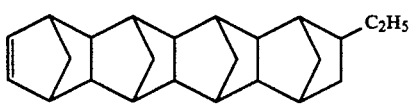
15-ethyloctacyclo[8,8,0,1²,⁹,1⁴,⁷,1¹¹,¹⁸,1¹³,¹⁶,0³,⁸,0¹²,¹⁷]-5-docosene (5) pentacyclo[6,6,1,1³,⁶,0²,⁷,0⁹,¹⁴]-4-hexadecene derivatives such as

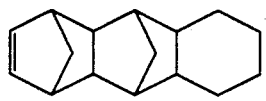
pentacyclo[6,6,1,1³,⁶,0²,⁷,0⁹,¹⁴]-4-hexadecene

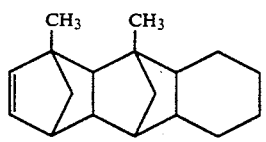
1,3-dimethylpentacyclo-[6,6,1,1³,⁶,0²,⁷,0⁹,¹⁴]-4-hexadecene

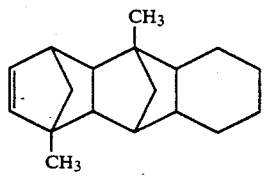
1,6-dimethylpentacyclo-[6,6,1,1³,⁶,0²,⁷,0⁹,¹⁴]-4-hexadecene

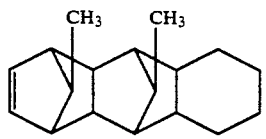
15,16-dimethylpentacyclo-[6,6,1,1³,⁶,0²,⁷,0⁹,¹⁴]-4-hexadecene (6) heptacyclo-5-icosene or heptacyclo-5-heneicosene derivatives such as

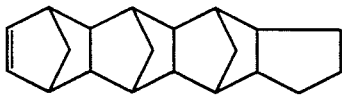
heptacyclo[8,7,0,1²,⁹,1⁴,⁷,1¹¹,¹⁷,0³,⁸,0¹²,¹⁶]-5-icosene

heptacyclo[8,7,0,1²,⁹,1⁴,⁷,1¹¹,¹⁸,0³,⁸,0¹²,¹⁷]-5-heneicosene (7) tricyclo[4,3,0,1²,⁵]-3-decene derivatives such as

tricyclo[4,3,0,1²,⁵]-3-decene

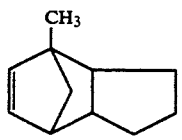
2-methyltricyclo[4,3,0,1²,⁵]-3-decene

-continued

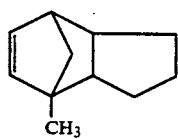
5-methyltricyclo[4,3,0,1$^{2,5}$]-3-decene (8) tricyclo[4,4,0,1$^{2,5}$]-3-undecene derivatives such as

tricyclo[4,4,0,1$^{2,5}$]-3-undecene

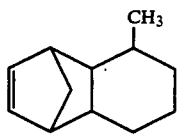
10-methyltricyclo[4,4,0,1$^{2,5}$]-3-undecene (9) pentacyclo[6,5,1,1$^{3,6}$,0$^{2,7}$,0$^{9,13}$]-4-pentadecene derivatives such as

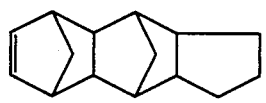
pentacyclo[6,5,1,1$^{3,6}$,0$^{2,7}$, 0$^{9,13}$]-4-pentadecene

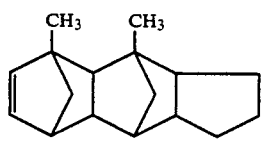
1,3-dimethylpentacyclo[6,5, 1,1$^{3,6}$,0$^{2,7}$,0$^{9,13}$]-4-pentadecene

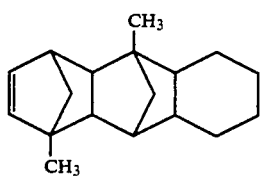
1,6-dimethylpentacyclo[6,5, 1,1$^{3,6}$,0$^{2,7}$,0$^{9,13}$]-4-pentadecene

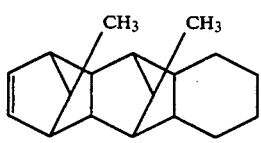
14,15-dimethylpentacyclo[6,5, 1,1$^{3,6}$,0$^{2,7}$,0$^{9,13}$]-4-pentadecene

(10) diene compounds such as

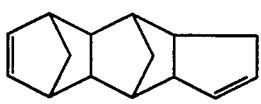
pentacyclo[6,5,1,1$^{3,6}$,0$^{2,7}$, 0$^{9,13}$]-4,10-pentadecadiene

(11) pentacyclo[4,7,0,1$^{2,5}$,0$^{8,13}$,1$^{9,12}$]-3-pentadecene derivatives such as

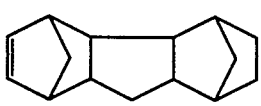
pentacyclo[4,7,0,1$^{2,5}$,0$^{8,13}$, 1$^{9,12}$]-3-pentadecene

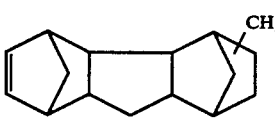
methyl-substituted pentacyclo[4,7,0,1$^{2,5}$,0$^{8,13}$, 1$^{9,12}$]-3-pentadecene

(12) heptacyclo[7,8,0,1$^{3,6}$,0$^{2,7}$,1$^{10,17}$,0$^{11,16}$,1$^{12,15}$]-4-eicosene derivatives such as

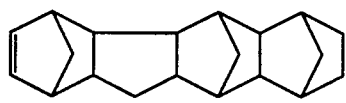
heptacyclo[7,8,0,1$^{3,6}$,0$^{2,7}$, 1$^{10,17}$,0$^{11,16}$,1$^{12,15}$]-4-eicosene -continued

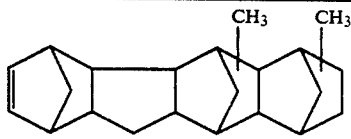 dimethyl-substituted hepta cyclo[7,8,0,1$^{3,6}$,0$^{2,7}$,1$^{10,17}$, 0$^{11,16}$,1$^{12,15}$]-4-eicosene

(13) nonacyclo[9,10,1,1$^{4,7}$,0$^{3,8}$,0$^{2,18}$,0$^{12,21}$,1$^{13,20}$, 0$^{14,19}$,1$^{15,18}$]-5-pentacosene derivatives such as

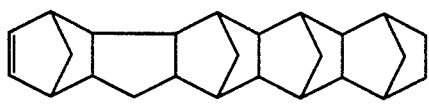 nonacyclo[9,10,1,1$^{4,7}$,0$^{3,8}$, 0$^{2,18}$,0$^{12,21}$,1$^{13,20}$,0$^{14,19}$, 1$^{15,18}$]-5-pentacosene

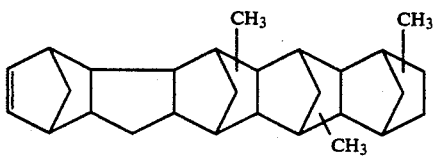 trimethyl substituted nonacyclo[9,10,1,1$^{4,7}$,0$^{3,8}$,0$^{2,18}$, 0$^{12,21}$,1$^{13,20}$,0$^{14,19}$,1$^{15,18}$]-5-pentacosene.

Other examples include:

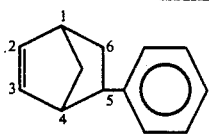 5-phenyl-bicyclo[2,2,1]hept-2-ene

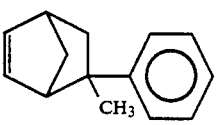 5-methyl-5-phenyl-bicyclo-[2,2,1]hept-2-ene

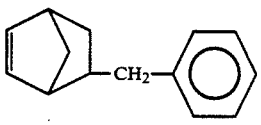 5-benzyl-bicyclo[2,2,1]hept-2-ene

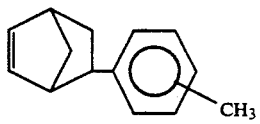 5-tolyl-bicyclo[2,2,1]hept-2-ene

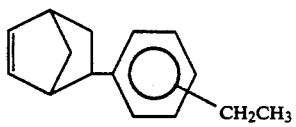 5-(ethylphenyl)-bicyclo-[2,2,1]hept-2-ene

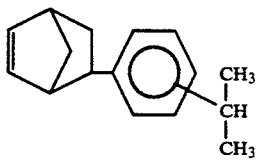 5-(isopropylphenyl)-bicyclo[2,2,1]hept-2-ene

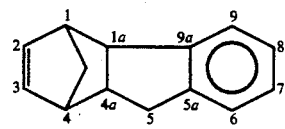 1,4-methano-1,1a,4,4a-tetrahydrofluolene

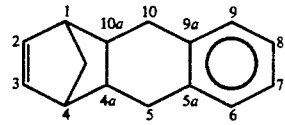 1,4-methano-1,4,4a,5,10,10a-hexahydroanthracene

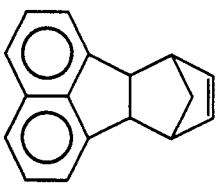
cyclopentadiene-acenaphthylene adduct

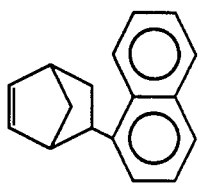
5-(α-naphthyl)-bicyclo-[2,2,1]-hept-2-ene, and

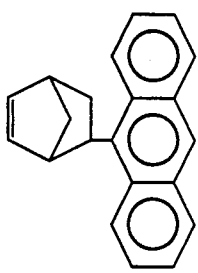
5-(anthracenyl)-bicyclo-[2,2,1]-hept-2-ene.

In addition to the above examples, further examples of the polycyclic olefins of formula (I) include octahydronaphthalenes such as 1,4,5,8-dimethano-1,2,3,4,4a,5,8,8a-octahydronaphthalene, 2-methyl-1,4,5,8-dimethano-1,2,3,4,4a,5,8,8a-octahydro-naphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2-n-butyl-1,4,5,8-dimethano-1,2,3,4,4a,5,8,8a-octahydronaphthalene, and 2-isobutyl-1,4,5,8-dimethano-1,2,3,4,4a,5,8,8a-octahydronaphthalene.

These cyclo-olefins may be used singly or in combination.

The cyclo-olefins of formula (I) or preferably formula (II) may be easily produced by condensing cyclopentadienes with the corresponding olefins or cyclo-olefins by the Diels-Alder reaction.

Cyclo-Olefin Polymer

The cyclo-olefin polymer constituting the sheet or film in this invention is at least one type of polymer selected from (1-a) ring-opened polymers or copolymers derived from the cyclo-olefins of formula (I), (1-b) hydrogenation products of these polymer or copolymers, and (2) addition polymers of ethylene with the cyclo-olefins of formula (I).

The ring-opened polymers or copolymers (1-a) derived from the cyclo-olefins of formula (I) and the hydrogenation products of these polymers or copolymers (1-b) will first be described.

The ring-opened polymers of the cyclo-olefins may be prepared by ring-opening polymerization of the cyclo-olefins of formula (I) including formulae (II) and (II-a)]by methods known per se. Typical examples of such ring-opened polymers or copolymers include (co)polymers of 1,4,5,8-dimethano-1,2,3,4,4a,5,8,8a-octahydronaphthalenes with each other, and ring-opened copolymers of 1,3,5,8-dimethano-1,2,3,4,4a,5,8,8a-octahydronaphthalenes with norbornene (bicyclo[2.2.1hept-2-ene).

Double bonds remain in the cyclo-olefin ring-opened polymers prepared as above. They may be easily hydrogenated by known methods. In the present invention, hydrogenation products of the cyclo-olefin ring-opened (co)polymers may also be used. Hydrogenation further improves thermal stability and weather resistance.

The ring-opened (co)polymers and hydrogenation products of these are believed to assume the following structure.

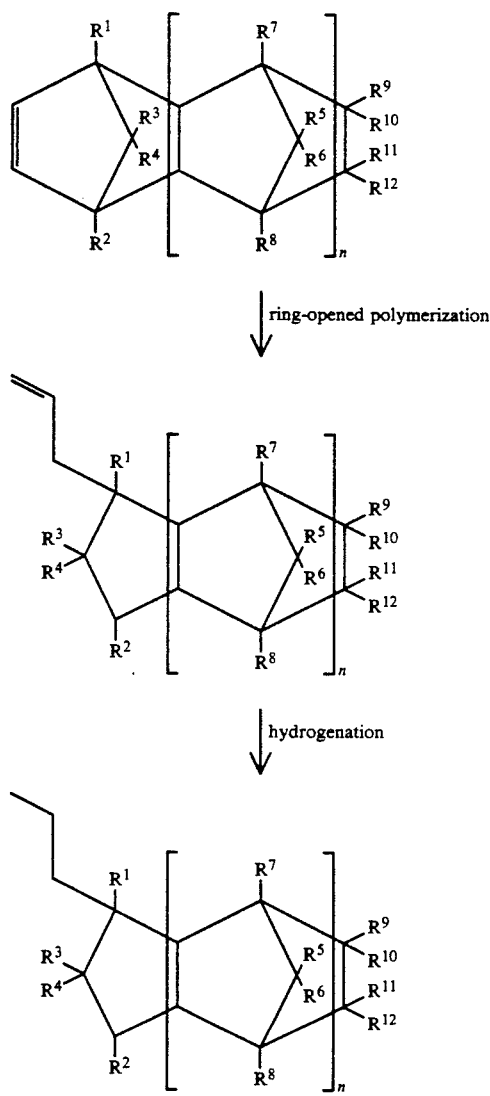

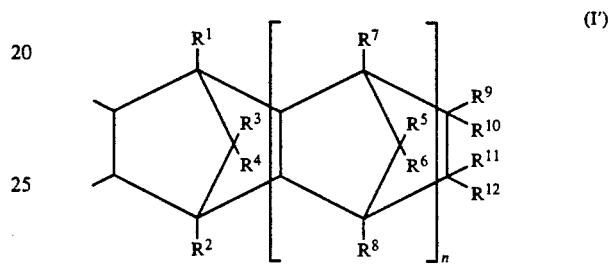

In the ring-opening polymerization, cyclo-olefins other than the cyclo-olefins of formula (I) [including formulae (II) and (II-a)) may be copolymerized. Examples of the other cyclo-olefins include cyclobutene, cyclopentene, cyclohexene, 3,4-dimethyl-cyclopentene, 3-methylcyclohexene, 2-(2-methylbutyl) 1-cyclohexene, 2,3,3a,7a-tetrahydro-4,7-methano-1H-indene and 3a,5,6,7a-tetrahydro-4,7-methano-1H-indene so long as it does not impair the properties of the cyclo-olefin ring-opened (co)polymers and their hydrogenation products.

The other cyclo-olefin may usually be employed in a proportion of not more than 20 mole %.

The addition polymers of ethylene with cyclo-olefins are the addition polymers of ethylene with the cyclo-olefins of formula (I) including formula (II) and (II-a).

In the addition polymers, ethylene is used in a proportion of preferably 40 to 85 mole %, especially preferably 50 to 75 mole %, and the cyclo-olefin is used in a proportion of preferably 15 to 60 mole %, especially preferably 25 to 50 mole %. Specifically, in the cyclo-olefin-/ethylene addition polymers, the recurring units derived from ethylene and the recurring units derived from cyclo-olefin are bonded in a mole ratio of preferably from 40:60 to 85:15, especially preferaly from 50:50 to 75:25.

The cyclo-olefin/ethylene addition polymers can be produced by polymerizing ethylene and the cyclo-olefin in the presence of a catalyst formed from a hydrocarbon-soluble vanadium compound and a halogen-containing organo-aluminum compound in a hydrocarbon medium.

Such a polymerization method is already known, and is proposed, for example, in Japanese Laid-Open Patent Publication No. 168708/1985.

It is believed that in the cyclo-olefin/ethylene addition polymers, at least part of the cyclo-olefin of formula (I) is randomly bonded to the recurring units derived from ethylene in the form of recurring units of formula (I').

wherein $R^1$ to $R^{12}$ and n are defined above.

In the present invention, the cyclo-olefin/ethylene addition polymer may also be an addition polymer of ethylene and the cyclo-olefin of formula (I) with an alpha-olefin other than ethylene and a cyclo-olefin other than the cyclo-olefin of formula (I) copolymerized therewith such that the properties of the copolymer are not impaired.

The other alpha-olefin is linear or branched. Examples of the alpha-olefin are alpha-olefins having 3 to 20 carbon atoms, such as propylene, 1-butene, 4-methyl-1-pentene, 1-hexene, 1-octene, 1-decene, 1-dodecene, 1-tetradecene, 1-hexadecene, 1-octadecene and 1-eicosene. Preferably, alpha-olefins having 3 to 15 carbon atoms, especially 3 to 10 carbon atoms, are used.

The cyclo-olefin other than the cyclo-olefins of formula (I) includes, for example, cyclobutene, cyclopentene, cyclohexene, 3,4-dimethylcyclopentene, 3-methylcyclohexene, 2-(2-methylbutyl)-1-cyclohexene, alpha-methylstyrene, 2,3,3a,7a-tetrahydro-4,7-methano-1-indene and 3a,5,6,7a-tetrahydro-4-methano-1H-indene.

When the other alpha-olefin and the other cyclo-olefin have two or more double bonds in the molecule, double bonds remaining unused in the addition polymerization may be hydrogenated to improve weatherability.

By the above addition and hydrogenation, the cyclo-olefin/ethylene addition polymer used in this invention may have an iodine value of usually not more than 5, mostly not more than 1.

It can be determined by $^{13}C$—NMR measurement that the cyclo-olefin of formula (I) used as a starting material has a structure of the above formula (I') in the cyclo-olefin/ethylene addition polymer. The cyclo-olefin/ethylene addition polymer has a chemically stable structure and excellent heat aging resistance.

The cyclo-olefin ring-opened (co)polymers (1-a), the hydrogenation products (1-b) and the cyclo-olefin- /ethylene addition polymers (2) have an intrinsic viscosity, measured in decalin at 135° C., of usually 0.01 to 20 dl/g, preferably 0.01 to 10 dl/g, especially 0.05 to 8 dl/g, further preferably 0.05 to 5 dl/g, most preferably 0.08 to 5 dl/g.

These cyclo-olefin polymers are generally amorphous or low-crystalline, preferably amorphous and therefore, have good transparency. Specifically, these cyclo-olefin polymers have a crystallinity, determined by X-ray diffractometry, of preferably 0 to 10%, more preferably 0 to 7%, especially preferably 0 to 5%, and mostly 0%. When these cyclo-olefin polymers are measured by a differential scanning calorimeter (DSC), melting points of most of them are not observed.

These cyclo-olefin polymers are also characterized by having a high glass transition temperature (Tg) and a high softening temperature (TMA). They have a glass transition temperature of usually 50° to 230° C., mostly 70° to 210° C., and a softening temperature of usually at least 70° C., preferably 70° to 250° C., especially 90° to 250° C., further preferably 90° to 230° C., most preferably 100° to 200° C. The cyclo-olefin polymers also have a heat decomposition temperature of 350° to 420° C., mostly 370° to 400° C.

As mechanical properties, they have a flexural modulus of usually $1 \times 10^4$ to $5 \times 10^4$ kg/cm$^2$, and a flexural strength of usually 300 to 1500 kg/cm$^2$.

They have a density of 0.86 to 1.10 g/cm$^2$, mostly 0.88 to 1.08 g/cm$^2$, a refractive index, measured in accordance with ASTM-D542, of 1.47 to 1.58, mostly 1.48 to 1.56. Furthermore, since the cyclo-olefin polymers are substantially amorphous, they have a haze (ASTM-D1003) of usually not more than 20%, mostly not more than 10%.

As electrical properties, they have a dielectric constant (1 KHz), measured in accordance with ASTM-D150, of 1.5 to 3.0, mostly 1.9 to 2.6, and a dielectric loss tangent of $9 \times 10^{-4}$ to $8 \times 10^{-5}$, mostly $3 \times 10^{-4}$ to $9 \times 10^{-5}$.

The film or sheet of the invention is formed from the cyclo-olefin polymer, but may also be formed from an intimate mixture of the cyclo-olefin polymer and another polymer, for example a polymer alloy. The other polymers will be described below.

Other polymers

Preferred examples of the other polymers are shown below.

(1) Polymers derived from hydrocarbons having one or two unsaturated bonds.

Examples are polyolefins such as polyethylene, polypropylene, polymethylbutene-1, poly(4-methylpentene-1), polybutene-1 and polystyrenes (which may have a crosslinked structure).

(2) Halogen-containing vinyl polymers.

Specific examples are polyvinyl chloride, polyvinylidene chloride, polyvinyl fluoride, polytetrafluoroethylene, polychloroprene and chlorinated rubbers.

(3) Polymers derived from alpha,beta-unsaturated acids

Specific examples include polyacrylate, polymethacrylate, polyacrylamide, polyacrylonitrile, copolymers of the monomers constituting the above polymers, such as acrylonitrile/butadiene/styrene copolymer, acrylo-nitrile/stryene copolymer and acrylonitrile/styrene/acrylate copolymers.

(4) Polymers derived from unsaturated alcohols, amines or their acyl derivatives or acetals Specific examples include polyvinyl alcohol, polyvinyl acetate, polyvinyl stearate, polyvinylbenzoate, polyvinyl maleate polyvinylbutyral, polyallyl phthalate, polyallyl melamine, copolymers of the monomers constituting the above polymers such as ethylene/vinyl acetate copolymer.

(5) Polymers derived from epoxides

Specific examples are polyethylene oxide and polymers derived from bis-glycidyl ether.

(6) Polyacetal

Specific examples are polyoxymethylene, polyoxyethylene and polyoxymethylene containing ethylene oxide as a comonomer.

(7) polyphenylene oxide polymers
(8) polycarbonates
(9) Polysulfones
(10) Polyurethanes and urea resins
(11) Polyamides and copolyamides derived from diamines and dicarboxylic acids and/or aminocarboxylic acids and the corresponding lactams. Specific examples are nylon 6, nylon 66, nylon 11 and nylon 12.

(12) Polyesters derived from dicarboxylic acids and dialcohols and/or hydroxycarboxylic acids or the corresponding lactones.

Specific examples are polyethylene terephthalate, polybutylene terephthalate, and poly-1,4-dimethylol cyclohexane terephthalate.

(13) Polymers having a crosslinked structure and derived from aldehydes, phenols and urea or melamine Specific examples include phenol-formaldehyde resins, urea-formaldehyde resins and malemine-formaldeyde resins.

(14) Alkyd resins such as glycerol-phthalic acid resin

(15) Unsaturated resins derived from copolyesters of saturated or unsaturated dicarboxylic acids and polyhydric alcohols using vinyl compounds as a cross-linking agent, and halogen-containing modified resins.

(16) Natural polymers such as cellulose, rubbers, proteins, and their derivatives such as cellulose derivatives, e.g. cellulose propionate and cellulose ethers.

(17) Flexible polymers

They are particularly rubber components selected from (1) to (5).

(1) Flexible copolymer of ethylene, another alpha-olefin, and the cyclo-olefin of formula (I) which has a intrinsic viscosity, measured in decalin at 135° C., of 0.01 to 10 dl/g, and a glass transition temperature of not more than 0° C., (2) amorphous or low-crystalline alpha-olefin copolymers formed from at least two alpha-olefins and having a glass transition temperature of not more than 0° C., (3) alpha-olefin/diene copolymers formed from at least two alpha-olefins and at least one conjugated diene and having a glass transition temperature of not more than 0° C., (4) aromatic vinyl hydrocarbon/conjugated diene random or block copolymers having a glass transition temperature of not more than 0° C., and (5) flexible polymers formed from isobutylene and flexible copolymers formed from isobutylene and conjugated dienes.

(1) Flexible Polymers Containing Units Derived From Cyclo-olefins

The flexible polymers containing units derived from cyclo-olefins can be prepared by copolymerizing ethylene, the cyclo-olefins of formula (I), (II) or (II-a) described above with regard to the cyclo-olefin polymers, and alpha-olefins. The alpha-olefins are preferably alpha-olefins having 3 to 20 carbon atoms. Examples of preferred alpha-olefins for use in this invention include propylene, 1-butene, 4-methyl-1-butene, 1-hexene, 1-octene, 1-decene, 1-dodecene, 1-tetradecene, 1-hexadecene, 1-octadecene and 1-eicosene.

Such cyclo-olefins or cyclodienes as ethylidene norbornene and dicyclopentadiene may used besides the above alpha-olefins or together with alpha-olefins.

In the flexible polymers (1) containing units derived from cyclo-olefins, the recurring units derived from ethylene are contained in a proportion of 40 to 98 mole %, preferably 50 to 90 mole %, and the recurring units derived from the alpha-olefin are contained in a proportion of 2 to 50 mole %. The recurring units derived from cyclo-olefin are contained in a proportion of 2 to 20 mole %, preferably 2 to 15 mole %.

Unlike the above cyclo-olefin polymers, the flexible polymers (1) have a glass transition temperature of not more than 0° C., preferably not more than −10° C., and have an intrinsic viscosity, measured in decalin at 135° C., of 0.01 to 10 dl/g, preferably 0.08 to 7 dl/g. The flexible polymers (1) have a crystallinity, measured by X-ray diffractometry, of 0 to 10%, preferably 0 to 7%, especially preferably 0 to 5%.

The flexible polymers (1) may be produced under properly selected conditions in the methods described, for example, in Japanese Laid-Open Patent Publications Nos. 168708/1985, 120816/1986, 115912/1986, 115916/1986, 271308/1986, 272216/1986, and 252406/1987.

(2) Alpha-Olefin Copolymers

The alpha-olefin copolymers (2) used as the flexible polymers are amorphous or low-crystalline co-polymers of at least two types of alpha-olefins. Examples of low-crystalline copolymers are ethylene/alpha-olefin copolymers and propylene/alpha-olefin co-polymers.

As the alpha-olefins constituting the ethylene/alpha-olefin copolymers, alpha-olefins having 3 to 20 carbon atoms are usually suitable. Specific examples are propylene, 1-butene, 4-methyl-1-butene, 1-hexene, 1-octene, 1-decene and mixtures of these. Among them, alpha-olefins having 3 to 10 carbon atoms are especially preferred.

In the ethylene/alpha-olefin copolymers, the mole ratio of the recurring units derived from ethylene to the recurring units derived from alpha-olefin is preferably adjusted to from 40:60 to 95:5, although it varies depending upon the type of the alpha-olefin. The above mole ratio is preferably from 40:60 to 90:10 if the alpha-olefin used is propylene. If the alpha-olefin has 4 or more carbon atoms, the above mole ratio is preferably from 50:50 to 95:5.

As the alpha-olefins constituting the propylene/alpha-olefin copolymers, alpha-olefins having 4 to 20 carbon atoms are generally used. Specific examples are 1-butene, 4-methyl-1-pentene, 1-hexene, 1-octene, 1-decene and mixtures of these. Alpha-olefins having 4 to 10 carbon atoms are especially preferred.

In the above propylene/alpha-olefin copolymers, the mole ratio of the recurring units derived from propylene to the recurring units derived from the alpha-olefins is preferably from 50:50 to 95:5 although it may vary depending upon the type of the alpha-olefin.

(3) Alpha-Olefin/Diene Copolymers

Ethylene/alpha-olefin/diene copolymer rubbers and propylene/alpha-olefin/diene copolymer rubbers are used as the alpha-olefin.diene copolymers (3) used as the flexible polymers.

Alpha-olefins constituting such copolymer rubbers usually have 3 to 20 carbon atoms (4 to 20 carbon atoms in the case of the propylene/alpha-olefin). Examples include propylene, 1-butene, 1-pentene, 4-methyl-1-pentene, 1-hexene, 1-octene, 1-decene and mix-tures of these. Of these, alpha-olefins having 3 to 10 carbon atoms are especially preferred.

Examples of the dienes constituting these copolymer rubbers include aliphatic non-conjugated dienes such as 1,4-hexadiene, 1,6-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and 2,3-diisopropylidene-5-norbornene, 2-ethylidene-3-isopropylidene-5-norbornene and 2-propenyl-2,2-norbornadiene.

In the ethylene/alpha-olefin/diene copolymer rubbers, the mole ratio of the recurring units derived from ethylene to the recurring units derived from alpha-olefin is preferably from 40:60 to 90:10 in general, although it may vary depending upon the type of the alpha-olefin.

The content of the recurring units derived from the diene in these copolymer rubbers is usually 1 to 20 mole %, preferably 2 to 15 mole %.

(4) Aromatic Vinyl Hydrocarbon-Conjugated Diene-Type Flexible Copolymers

Aromatic vinyl hydrocarbon/conjugated diene random copolymers or block copolymers or hydrogenation products of these copolymers are used as the aromatic vinyl hydrogen/conjugated diene flexible copolymers used as the flexible polymers.

Specific examples include styrene/butadiene block copolymer rubber, styrene/butadiene/styrene block copolymer rubber, styrene/isoprene block copolymer rubber, styrene/isoprene/styrene block copolymer rubber, hydrogenated styrene/butadiene/styrene block copolymer rubber, hydrogenated styrene/isoprene/styrene block copolymer rubber, and styrene/butadiene random copolymer rubber.

In these copolymer rubbers, the mole ratio of the recurring units derived from the aromatic vinyl hydrocarbon to the recurring units derived from the conjugated diene is usually from 10:90 to 70:30. The hydrogenated copolymer rubbers are copolymer rubbers obtained by hydrogenating the double bonds remaining in the copolymer rubbers partly or wholly.

(5) Flexible Polymers or Copolymers Comprising Isobutylene or Isobutylene and A Conjugated Diene Specific examples of the flexible polymer or copolymer (5) are polyisobutylene rubber, polyisoprene rubber, polybutadiene rubber and isobutylene/isoprene copolymer rubber.

The flexible copolymers (2) to (5) have the nearly same properties as the cyclo-olefin polymers (1). Usually they have an intrinsic viscosity, measured in decalin at 135° C., of 0.01 to 10 dl/g, preferably 0.08 to 7 dl/g, a glass transition temperature (Tg) of not more than 0°

C., preferably not more than −10° C., especially preferably not more than −20° C., and a crystallinity, measured by X-ray diffractometry, of usually 0 to 10%, preferably 0 to 7%, and especially preferably 0 to 5%.

These flexible polymers (1) to (5) may be used directly, or after a crosslinked structure is formed in them, they may be blended with the cyclo-olefin polymer (1). Alternatively, after they are blended with the cyclo-olefin polymer (1), a crosslinked structure may be formed. The flexible polymer is present in an amount of 5 to 150 parts by weight, preferably 5 to 100 parts by weight, especially preferably 10 to 80 parts by weight, as the total amount of the flexible polymers (1) to (5), per 100 parts by weight of the cyclo-olefin addition polymer. By meeting these blending ratio requirement, polymer alloys having impact strength, rigidity, heat distortion temperature, and hardness in a well-balanced combination can be obtained.

Preferably, the polymer alloys have a melt flow index (MFR under the condition of ASTM-D1238) of preferably 0.1 to 100.

To form a crosslinked structure as above, organic peroxides are usually used. Examples of organic peroxides used to perform crosslinking polymerization include (a) ketone peroxides such as methyl ethyl ketone peroxide and cyclohexanone peroxide; (b) peroxy ketals such as 1,1-bis(t-butylperoxy)cyclohexane and 2,2-bis-(t-butylperoxy)octane; (c) hydroperoxides such as t-butyl hydroperoxide, cumene hydroperoxide, 2,5-dimethylhexane-2,5-dihydroxyperoxide and 1,1,3,3-tetramethylbutyl hydroperoxide; (d) dialkyl peroxides such as di-t-butyl peroxide, 2,5-dimethyl-2,5-di(t-butylperoxy)hexane and 2,5-dimethyl-2,5-di(t-butylperoxy)hexyne-3; (e) diacyl peroxides such as lauroyl peroxide and benzoyl peroxide; and (f) peroxy esters such as t-butyl peroxyacetate, t-butyl peroxybenzoate and 2,5-dimethyl-2,5-di(benzoylperoxy)hexane.

The amount of the organic peroxide component to be incorporated is usually 0.01 to 1 part by weight, preferably 0.05 to 0.5 part by weight, per 100 parts by weight of the cyclo-olefin addition polymer and the flexible polymer combined.

By further including a compound having two or more radical polymerizable functional groups in the molecule at the time at the time of treatment with the organic peroxide, polymer alloys having excellent impact strength can be obtained. Specifically, by carrying out the crosslinking reaction in the presence of the compound having two or more radical polymerizable functional groups in the molecule, the crosslinking efficiency increases.

Examples of the compound having at least two radical-polymerizable functional groups in the molecule include divinylbenzene, vinyl acrylate and vinyl methacrylate. These compounds may be used in an amount of usually not more than 1 part by weight, preferably 0.1 to 0.5 part by weight, per 100 parts by weight of the cyclo-olefin resin and the flexible polymer combined.

By incorporating the above-described flexible polymers, the flexibility of the sheet or film can be improved.

Various additives may be incorporated into the above cyclo-olefin ring-opened (co)polymers, the hydrogenation products of the (co)polymers, the cyclo-olefin-/ethylene addition polymers, and the mixtures of the polymers and the other polymers described above to form the film and sheet of the invention.

Additives

Examples of the additives include heat stabilizers, weatherability stabilizers, antistatic agents, slip agents, antiblocking agents, antihaze agents, lublicants, dyes, pigments, natural oils, synthetic oils, waxes and organic or inorganic fillers.

Examples of stabilizers include phenolic antioxidants such as tetrakis[methylene-3-(3,5-di-t-butyl-4-hydroxyphenyl)propionate]methane, alkyl beta-(3,5-di-t-butyl-4-hydroxyphenyl)propionate and 2,2'-oxamidebisethyl-3-(3,5-di-t-butyl-4-hydroxyphenyl)propionate; aliphatic metal salt such as zinc stearate, calcium stearate and calcium 1,2-hydroxystearate; and polyhydric alcohol aliphatic acid esters such as glycerin monostearate, glycerin distearate, pentaerythrititol monostearate, pentaerythritol distearate and pentaerythritol tristerate. They may be used either singly or in combination. For example, a combination of tetrakis[methylene-3-(3,5-di-t-butyl-4-hydroxyphenyl)propionatemethane, zinc stearate and glycerin monostearate may be cited as an example.

Examples of the organic or inorganic fillers include silica, diatomaceous earth, alumina, titanium dioxide, magnesium oxide, pumice powder, pumice balloons, aluminum hydroxide, magnesium hydroxide, basic magnesium carbonate, dolomite, calcium sulfate, potassium titanate, barium sulfate, mica, asbestos, glass fibers, glass flakes, glass beads, calcium silicate, montmorilonite, bentonite, graphite, aluminum powder, molybdenum sulfide, boron fibers, silicon carbide fibers, polyethylene fibers, polypropylene fibers, polyester fibers and polyamide fibers.

The cyclo-olefin resin and the other components may be mixed by known methods. For example, all of the components may be simultaneously mixed.

The film or sheet of this invention will be described below.

Production Of The Sheet or Film

The cyclo-olefin polymer or the with other polymer may be shaped into the form of a film or a sheet by known methods such as a T-die method or an inflation method. The thickness of the sheet or film of this invention may be properly determined by considering its application. The sheet or film of the invention may be unstretched, or monoaxially or biaxially stretched.

The unstretched sheet or film may be prepared as an unstretched press sheet or film.

A monoaxially or biaxially stretched film or sheet may be prepared by stretching an unstretched sheet or film at a temperature above the glass transition temperature. The stretch ratio may be determined properly by considering the desired properties such as strength. Method of stretching may be any of generally used methods such as a roll stretching method, a tenter stretching method or an inflation method.

The method of producing the sheet or film of this invention will be described more specifically. The cyclo-olefin polymer or its blend prepared as above is shaped, for example, by the T-die method or the inflation method to form a sheet or film having a thickness of 0.05 to 5 mm. The resulting unstretched sheet or film, may be used as such or after it is stretched. In the latter case, the unstretched film or sheet is heated to a temperature higher than the glass transition temperature of the polymer (or the polyblend) forming the sheet or film, preferably 0 to 60° C., especially preferably 10 to 40° C.

higher than the glass transition temperature. Then, the heated sheet or film is stretched consecutively in the longitudinal direction and the transverse direction, or simultaneously in both directions, for example, at a stretch ratio of 2 to 50 preferably 3 to 30, to give a biaxially stretched film or sheet.

The sheet or film of this invention so obtained has especially superior gas-barrier properly, alongation resistance and ease of tearing. The sheet or film of this invention has good transparency and surface properties. The film or sheet of this invention further has good heat-sealability.

The sheet or film of this invention also has excellent chemical resistance. When, for example, it is immersed for about 24 hours in sulfuric acid, aqueous ammonia, acetone and ethyl acetate, discoloration cracking deformation, or dissolution do not appreciably occur.

The sheet or film of this invention have excellent properties and are suitable as packaging materials, particularly for foods.

Since the sheet or film of this invention is composed of the cyclo-olefin polymers (1-a), (1-b) and (2), it has excellent gas-barrier property and elongation resistance. When they are used as a container, a packaging material, or as a shielding material, it can permit sufficient storage of an article to be packed.

Furthermore, the sheet or film of this invention can be easily torn. Therefore, a packing material or a tape produced from the sheet or film of the invention can be easily opened or broken by hand.

The following examples illustrate the present invention specifically.

The various properties of the sheet or film of the invention can be measured and evaluated by the following methods.

(1) Melt Flow Index (MFR)

Measured in accordance with ASTM-D1238 at a predetermined temperature (ToC) under a load of 2.16 kg.

(2) Softening Temperature (TMA)

A Thermomechanical Analyzer made by E. I. du Pont de Nemours & Co. was used, and by the heat distortion behavior of a sheet having a thickness of 1 mm, the softening temperature was measured. A quartz needle was placed on the sheet, and a load of 49 g was applied. The sheet was heated at a rate of 5° C./min., and the temperature at which the needle penetrated to sheet to a depth of 0.635 mm was measured, and defined as TMA.

(3) Glass Transition Temperature

Measured by DSC-20 made by SEIKO Electronics Industry Co., Ltd., Tg was measured at a temperature elevating rate of 10° C./min.

(4) Haze

Measured in accordance with ASTM-D1003.

(5) Gloss

Measured in accordance with ASTM-D523. The angle of incidence was 60°.

(6) Tensile Test

From the product obtained in a working example, a Dumbelle-shaped test piece was prepared in accordance with ASTM type IV. Using this test piece, the tensile test was conducted at 23° C. by the method of ASTM-D638.

(7) Film Impact

A test piece having a size of 100×100 mm was cut out from the shaped article. The impact strength was measured by a film impact tester made by Toyo Seiki. The impact head: diameter 1 inch (8) Tear Strength Measured by the Elmendorf method in accordance with JIS Z1702 at 23°.

(9) Heat-Sealability

Two test pieces having a size of 120×120 mm, taken from the shaped article obtained in a working example, were superimposed and heat-sealed by a heat sealer kept at a predetermined temperature under a pressure of 2 kg/cm$^2$ for 1 second. The heat-sealed test sample was cut in a rectangular shape with a width of 15 cm, and at 23° C., its strength was measured at angle of 180°. The testing speed was 300 mm/min.

(10) Gas Permeability

Oxygen Gas Permeability

Measured by an oxygen gas permeability tester (OX-TRAN 100, made by Modern Control Co., Ltd.).

Carbon Dioxide Gas Permeability

Measured by using a carbon dioxide gas permeability tester (Mocon Permatranc-IV type, made by Modern Control Co., Ltd).

EXAMPLE 1

As a cyclo-olefin copolymer, a random copolymer of ethylene and 1,4,5,8-dimethano-1,2,3,4,4a,5,8,8a-octahydronaphthalene (structure

to be referred to as DMON) having an ethylene content of 71 mole % measured by $^{13}$C—NMR, an intrinsic viscosity, measured in decalin at 135° C. of 0.60 dl/g, a softening point of 115° C. and a glass transition temperature of 98° C. was used as a material.

From this material a sheet having a thickness of 130 micrometers was produced by type T-die shaping method by using an extruder having a cylinder diameter of 30 mm. Test pieces were prepared from the resulting sheet, and their physical properties were measured.

The results are shown in Table 1.

EXAMPLE 2

The same resin material as used in Example 1 was shaped into a sheet by the T-die method using an extruder having a cylinder diameter of 30 mm. The sheet was biaxially stretched at 130° C. at a stretch ratio of 2×2 to prepare a stretched sheet (thickness 95 micrometers), and its properties were measured.

The results are shown in Table 1.

EXAMPLE 3

Pellets 3.4 kg) of an ethylene/DMON random copolymer (ethylene content measured by $^{13}$C—NMR: 62 mole %; MFR measured at 220° C.: 30 g/10 min.; intrinsic viscosity measured in decalin at 135° C.: 0.47 dl/g; TMA: 148° C.; Tg: 137° C.) as a cyclo-olefin copolymer were mixed with 0.6 kg of pellets of ethylene/propylene random copolymer (ethylene content: 80 mole %; Tg: −54° C.) as a rubber component. The mixture was melt kneaded by a twin-screw extruder (PCM 45 made by Ikegai Tekko Co., Ltd.) as cylinder temperature of 220° C. and pelletized to form pellets.

A sheet having a thickness of 50 micrometers was prepared from the resulting pellets in the same way as in Example 1. The properties of the sheet were measured.

The results are shown in Table 1.

EXAMPLE 4

One kilogram of the pellets obtained in Example 3 were mixed fully with 1 g of Perhexyte 25 Be (Nippon Oils and Fats Co., Ltd.) and 3 g of divinylbenzene. The mixture was reacted in the molten state by a twin-screw extruder (cylinder temperature: 230° C.), and pelletized.

The resulting pellets were formed into a sheet having a thickness of 50 micrometers by the same method as in Example 3, and its properties were measured.

The results are shown in Table 1.

TABLE 1

| Properties | | 1 | 2 | 3 | 4 |
|---|---|---|---|---|---|
| Haze (%) | | — | 0.5 | 85 | — |
| Gloss (%) | | — | — | 0.5 | — |
| Tensile strength (machine/transverse) | | | | | |
| Stress at yield (kg/cm$^2$) | | — | — | 480/350 | 500/640 |
| Stress at break (kg/cm$^2$) | | 620 | 830 | — | — |
| Elongation at break (%) | | 3 | 7 | 7/20 | 24/27 |
| Modulus (kg/cm$^2$) | | 20 | 29 | 22/22 | —/— |
| Film at impact (kg·cm/cm) | at 23° C. | 70 | 470 | 1300 | 1300 |
| | at 0° C. | — | — | 900 | 1000 |
| Teat strength (machine/transverse) (kg/cm) | | — | — | 1.6/1.8 | 1.8/2.0 |
| Heat sealability g/15 mm width) | 180° C. | 550 | — | — | — |
| | 200° C. | 1080 | — | 570 | 600 |
| | 200° C. | 510 | — | 1170 | 1230 |
| Gas permability (cm$^3$·mm/m$^2$ 24 hrs. atm) | CO$_2$ | — | 80 | — | — |
| | O$_2$ | — | 20 | — | — |

We claim:

1. A sheet of a film composed of an intimate mixture of:

(A) at least one cyclo-olefin polymer selected from the group consisting of ring-opened polymers of at least one cyclo-olefin of formula (I)

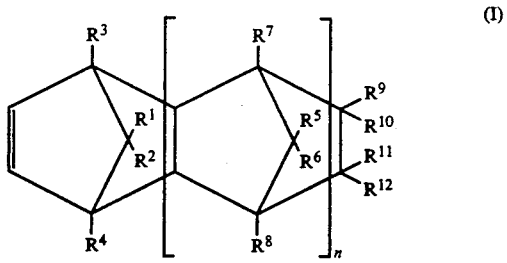

wherein $R^1$ to $R^{12}$, independently from each other, represent a member selected from the class consisting of a hydrogen atom, halogen atoms and hydrocarbon groups; two of $R^9$ to $R^{12}$ may be linked to each other together with the carbon atoms to which they are bonded to form a monocyclic or polycyclic group which may contain a double bond; $R^9$ and $R^{10}$, or $R^{11}$ and $R^{12}$ may each form an alkylidene group together with the carbon atoms to which they are bonded; and n is 0 or a positive integer, hydrogenation products of said polymers; and addition polymers of the cyclo-olefins of formula (I) with ethylene, said cyclo-olefin polymer having an intrinsic viscosity [η], measured in decalin at 135° C., of 0.01 to 10 dl/g and a softening temperature of at least 70° C.

(B) at least one flexible polymer in which a crosslinked structure is formed, said flexible polymer being selected from (1) flexible copolymer of ethylene, another alpha-olefin, and the cyclo-olefin of formula (I) which has an intrinsic viscosity, measured in decalin at 135° C., of 0.01 to 10 dl/g, and a glass transition temperature of not more than 20° C., (2) amorphous or low-crystalline alpha-olefin copolymers formed from at least two alpha-olefins and having a glass transition temperature of not more than 0° C., (3) alpha-olefin/diene copolymers formed from at least two alpha-olefins and at least one conjugated diene and having a glass transition temperature of not more than 0° C., (4) aromatic vinyl hydrocarbon/conjugated diene random or block copolymers having a glass transition temperature of not more than 0° C. and (5) flexible polymers formed from isobutylene and flexible copolymers formed from isobutylene and conjugated dienes.

2. A sheet or film of claim 1, in which the crosslinked structure is formed after the cyclo-olefin polymer and the flexible polymer are blended.

* * * * *

UNITED STATES PATENT AND TRADEMARK OFFICE
CERTIFICATE OF CORRECTION

PATENT NO. : 5,218,049

DATED : June 8, 1993

INVENTOR(S) : YAMAMOTO, ET AL.

It is certified that error appears in the above-identified patent and that said Letters Patent is hereby corrected as shown below:

Column 35, line 53, change "A sheet of a film composed of an intimate mixture" to --A sheet or a film composed of an intimate mixture--.

Signed and Sealed this

Twenty-second Day of March, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,218,049
DATED : June 8, 1993
INVENTOR(S) : Yohzoh YAMAMOTO, et al.

It is certified that error appears in the above-indentified patent and that said Letters Patent is hereby corrected as shown below:

At col. 36, line 37, delete "20°" and insert therefor —0°—.

Signed and Sealed this

Seventeenth Day of October, 1995

Attest:

BRUCE LEHMAN

*Attesting Officer*     *Commissioner of Patents and Trademarks*